July 8, 1941.  T. E. D. BILDE  2,248,269
COUPLING
Filed March 11, 1939
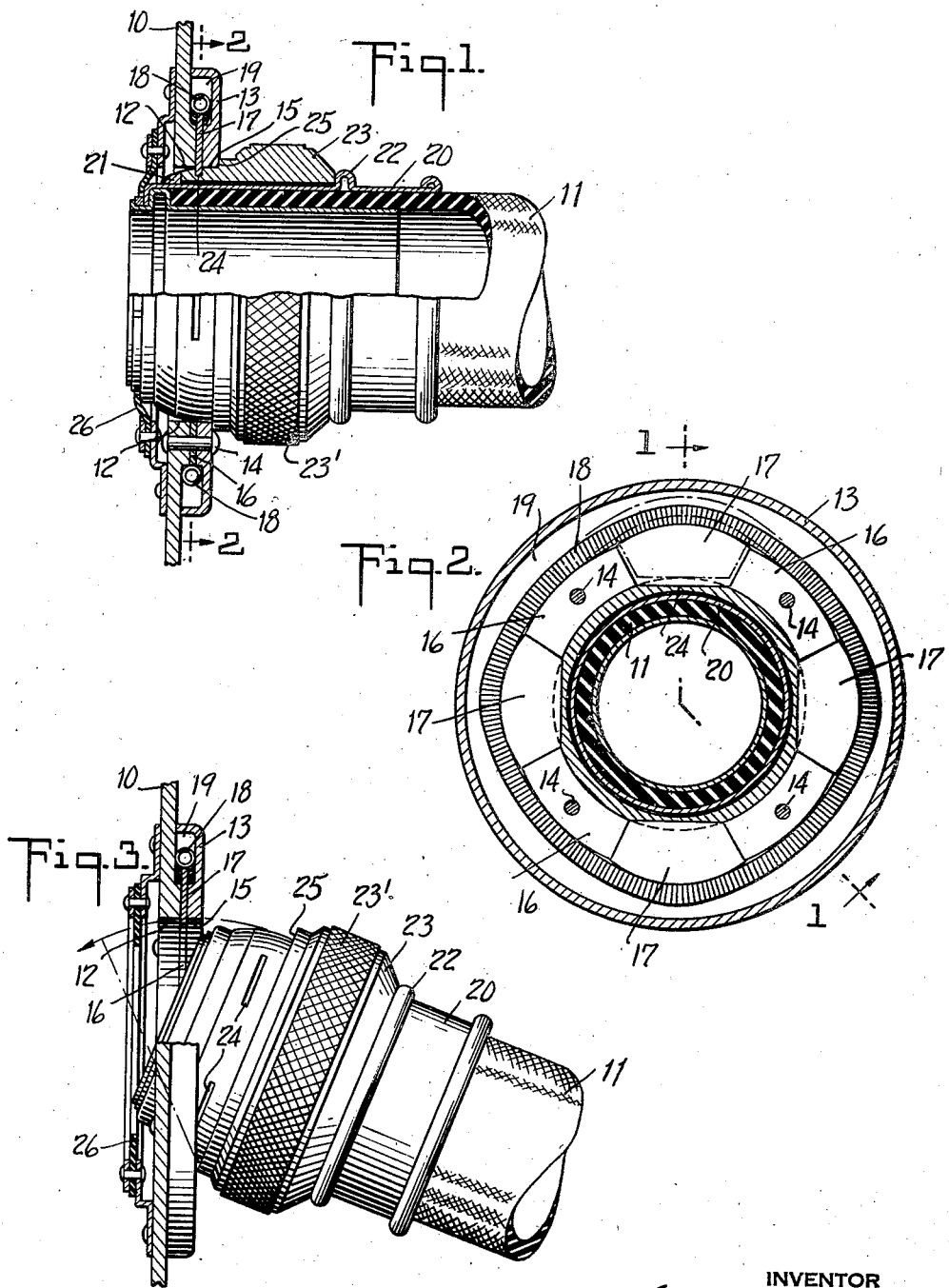
INVENTOR
Tord Erich Daniel Bilde
BY
Thomas C. Betts
his ATTORNEY Patented July 8, 1941

2,248,269

UNITED STATES PATENT OFFICE 2,248,269

COUPLING

Tord Erik Daniel Bilde, Stockholm, Sweden, assignor to Electrolux Corporation, Dover, Del., a corporation of Delaware Application March 11, 1939, Serial No. 261,232
In Sweden March 12, 1938

2 Claims. (Cl. 285—169)

My invention relates to a rotatable coupling for releasably connecting two fluid conveying elements together and is particularly adapted for connecting a suction hose to a vacuum cleaner.

Among the objects of my invention are to provide a coupling arrangement whereby one element may be connected to the other by merely pressing the two elements together, the arrangement being such that the coupling is capable of sustaining force tending to separate the elements. Another object of my invention is to provide a coupling of this nature which may be released by merely turning through a small angle a sleeve or the like which is associated with one of the elements. A further object is to provide a coupling of this nature permitting relative rotation between the elements, such rotation however having no tendency to release the coupling. A still further object is to provide means for automatically separating the elements a slight amount immediately upon their release.

Further objects and advantages of my invention may be apparent from the following description considered in connection with the accompanying drawing, which forms a part of this specification and of which:

Fig. 1 is a cross-sectional view of a coupling in accordance with my invention and is taken on the line 1—1 of Fig. 2;

Fig. 2 is a cross-sectional view taken on the line 2—2 of Fig. 1, and

Fig. 3 is a view, partially in cross section, similar to Fig. 1, but showing the parts in a different position.

Referring to the drawing, reference character 10 designates a portion of a vacuum cleaner casing to which it is desired to connect a hose or other fluid conveying conduit 11. The casing 10 is formed with an opening 12. An annular plate 13 is secured to the casing 10 by means of rivets or the like 14. This plate is formed with a central opening 15, preferably of the same diameter as the opening 12 and in alignment therewith. Disposed between casing 10 and ring 13 are a plurality of fixed plates 16, a rivet 14, passing through each of these plates. Plates 16 serve to space the annular plate 13 from the casing and provide segment-shaped spaces between the annular plate and the casing. Disposed in these spaces are movable tongues 17 which are urged radially inwardly by means of a coil spring 18 disposed in a space 19 formed by the annular plate 13. Inward movement of the tongues 17 is limited by the end surfaces of the fixed plates 16.

Secured in any suitable manner to the end of the hose 11 is a sleeve 20 adjacent to the end of which is secured a ring 21. Spaced a suitable distance from this ring is an annular projection 22 and rotatably mounted on the sleeve between the ring 21 and the projection 22 is a member 23, preferably formed with a knurled hand grasp portion 23'. A plurality of slots 24 are formed in the outer surface of the member 23 adjacent to the inner end thereof, the number of slots being equal to the number of movable tongues 17. The dimensions of these slots are such as to permit them to receive the tongues 17, but with a minimum of play. Member 23 is formed with a shoulder 25 spaced outwardly from the slots 24 a distance such that when the shoulder contacts the outer surface of annular plate 13, the slots 24 and the tongues 17 are disposed in the same plane.

The outer surface of ring 21 and that portion of the outer surface of member 23 which is disposed inwardly from the slots 24 have a spherical or conical contour.

If desired, a rubber or leather washer or the like 26 may be secured on the inner side of casing 10 and arranged to be contacted by the inner end of the hose in order to aid in preventing leakage of air through the coupling.

The above described device operates as follows. Assuming the hose 11 to be disconnected from the vacuum cleaner casing 10, it may be connected thereto by placing the end of the hose in the position shown in Fig. 3, that is with the axis of the hose at an angle to the axis of the opening 12 in the casing. If the hose is then pivoted in the direction of the arrow in Fig. 3, the spherical surface formed on the ring 21 and the member 23 will engage the inner ends of the tongues 17 and displace these tongues radially against the force of spring 18 as the hose is so pivoted. When the hose has been pivoted until its axis coincides with the axis of opening 12, and shoulder 25 abuts against plate 13 the slots 24 will then be in the same plane as the tongues 17 and, if the tongues and the slots happen to be in angular alignment, the spring 18 will project the tongues into the slots. If they are not in angular alignment, the member 23 is rotated on the sleeve 20 until such alignment is obtained, whereupon the tongues engage the slots.

Inasmuch as the tongues are movable only in a radial direction, it is apparent that an axial directed force tending to separate the hose from the casing has no tendency to displace the tongues radially. Moreover, the hose 11 and sleeve 22 may rotate within the member 23.

In order to release the coupling, it is only necessary to grasp the member 23 and to turn it through a small angle. Such turning causes the bottoms of the slots 24 to press the tongues 17 outwardly against the force of spring 18 until the tongues ride up on the unslotted portion of the member 23. Inasmuch as this portion is spherical, the tongues 17 bearing against it under the action of spring 18, force the end of the hose a slight distance to the right, as viewed in Fig. 1. Consequently, should the rotation of member 23 be continued sufficiently to bring the tongues and slots again into angular alignment, they will no longer be in the same plane, and accidental re-engagement will be avoided.

The provision of the washer 26 assures that a minimum of leakage will occur between the hose and the casing, although such leakage is quite effectively prevented by the engagement of the shoulder 25 with the annular plate 13.

While I have shown and described a preferred embodiment of my invention, it is to be understood that this has been done for purpose of illustration only and that the scope of my invention is not to be limited thereby, but is to be determined by the appended claims.

What I claim is:

1. In a releasable coupling for securing two telescoping hollow fluid conveying elements together, means forming a plurality of spaces angularly disposed around one of said elements and opening toward the other of said elements, radially movable members disposed in said spaces, and projectable through said openings, and resilient means for projecting the members through the openings, said other element being formed with angularly spaced recesses for receiving said members when the members and recesses are in alignment, the surface of said other element between said recesses being inclined with respect to the direction of movement of said members, whereby when said elements are turned to bring said members out of alignment with said recesses, the members contact said inclined surface and under the influence of said resilient means tend to separate said element axially.

2. In a releasable coupling for securing a fluid conveying conduit to an opening in a casing, an annular plate secured to said casing around the opening, angularly spaced members fixed between the casing and said plate for providing wedge-shaped spaces, radially movable members disposed in said spaces, a spring member contacting the radially outer ends of said members for urging them radially inwardly, said conduit including a member formed with angularly spaced recesses arranged to receive said members when the conduit is placed in said opening with the members and recesses in angular alignment, the surface of said conduit adjacent to said recesses being inclined with respect to the direction of movement of said members and arranged to be contacted by said members when the latter are angularly out of alignment with said recesses, whereby said members under the influence of said spring member tend to move said conduit out of said opening.

TORD ERIK DANIEL BILDE.